(12) United States Patent
Germain et al.

(10) Patent No.: US 8,065,056 B2
(45) Date of Patent: Nov. 22, 2011

(54) VEHICLE ROLL CONTROL SYSTEM

(75) Inventors: Philippe Germain, Montreuil (FR); Christophe Cardon, Saint Denis sur Loire (FR); Bruno Perree, Paris (FR); Frederic Sauvage, Antony (FR)

(73) Assignee: BWI Company Limited S.A., Luxemboug (LU)

( * ) Notice: Subject to any disclaimer, the term of this patent is extended or adjusted under 35 U.S.C. 154(b) by 998 days.

(21) Appl. No.: 11/579,466

(22) PCT Filed: Apr. 27, 2005

(86) PCT No.: PCT/EP2005/004509
§ 371 (c)(1), (2), (4) Date: Dec. 27, 2007

(87) PCT Pub. No.: WO2005/108128
PCT Pub. Date: Nov. 17, 2005

(65) Prior Publication Data
US 2008/0140284 A1 Jun. 12, 2008

(51) Int. Cl.
*B60G 21/073* (2006.01)
(52) U.S. Cl. .............. 701/38; 280/124.107; 280/124.16; 280/5.506
(58) Field of Classification Search .................... 701/37, 701/38; 280/124.106, 124.107, 124.16, 124.161, 280/5.506, 5.507, 5.508, 5.511
See application file for complete search history.

(56) References Cited

U.S. PATENT DOCUMENTS

| | | | | |
|---|---|---|---|---|
| 4,613,153 A * | 9/1986 | Shibahata et al. | ......... | 280/5.511 |
| 5,480,186 A * | 1/1996 | Smith | ......... | 280/5.511 |
| 5,630,623 A * | 5/1997 | Ganzel | ......... | 280/124.106 |
| 6,520,510 B1 * | 2/2003 | Germain et al. | ......... | 280/5.511 |
| 6,533,294 B1 * | 3/2003 | Germain et al. | ......... | 280/5.511 |
| 7,055,832 B2 * | 6/2006 | Germain | ......... | 280/5.508 |
| 7,293,780 B2 * | 11/2007 | Germain et al. | ......... | 280/5.506 |
| 7,694,984 B2 * | 4/2010 | Germain | ......... | 280/124.161 |
| 7,735,846 B2 * | 6/2010 | Germain | ......... | 280/124.16 |
| 7,748,720 B2 * | 7/2010 | Germain | ......... | 280/5.506 |
| 7,862,052 B2 * | 1/2011 | Germain | ......... | 280/5.506 |
| 2005/0280237 A1 * | 12/2005 | Stacey et al. | ......... | 280/124.16 |

* cited by examiner

*Primary Examiner* — Ruth Ilan
(74) *Attorney, Agent, or Firm* — Dickinson Wright PLLC

(57) ABSTRACT

A vehicle roll control system, comprising a front torsion bar(22), attached to the front hydraulic actuator (34) and a rear torsion bar (24) attached to the rear hydraulic actuator (34'). A pressure control valve (99) is fluidly connected between a pressure source (80) and a reservoir (81). A directional valve (82) is fluidly connected between the pressure control valve (99) and the hydraulic actuators (34,34'). A pressure relief valve (83,84) fluidly connects the directional valve to the pressure source (80) or the reservoir (81) and is actuated to create pressure differential between first fluid chambers (58,58') of the hydraulic actuators (34,34')and/or to create pressure differential between second fluid chambers (60,60') of the hydraulic actuators (34,34').

19 Claims, 16 Drawing Sheets

VEHICLE ROLL CONTROL SYSTEM

TECHNICAL FIELD

The present invention relates to a roll control system for a motor vehicle.

BACKGROUND OF THE INVENTION

EP-A-1103395 discloses a vehicle roll control system in which a pair of directional valves and a pressure control valve are used to control the movement of the piston of hydraulic actuators associated with the front and rear axles of a motor vehicle. WO-A-03/093041 discloses a vehicle roll control system in which a pair of pressure control valves and a directional valve are used to control the movement of the piston of hydraulic actuators associated with the front and rear axles of a motor vehicle. In both cases, each hydraulic actuator has a first fluid chamber positioned on one side of the piston, and a second fluid chamber positioned on the other side of the piston. The first fluid chambers of the front and rear hydraulic actuators receive hydraulic fluid at substantially the same pressure; and the second fluid chambers of the front and rear hydraulic actuators receive hydraulic fluid at substantially the same pressure.

SUMMARY OF THE INVENTION

The aim of the present invention is to provide a roll control system which is an improvement to the above mentioned arrangements.

A vehicle roll control system in accordance with the present invention is characterised by the features specified in claim 1.

In the present invention, the control means for the hydraulic circuit is capable of providing fluid pressure to the first fluid chamber of the front hydraulic actuator which is different from the fluid pressure provided to the first fluid chamber of the rear hydraulic actuator; and/or is capable of providing fluid pressure to the second fluid chamber of the front hydraulic actuator which is different from the fluid pressure provided to second fluid chamber of the rear hydraulic actuator.

The present invention provides a system which allows an aggressive roll control strategy and balance strategy which leads to improvements in motion, turning, and stability (braking in turn at high speed). The present invention also provides continuous control between right turn and left turn.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
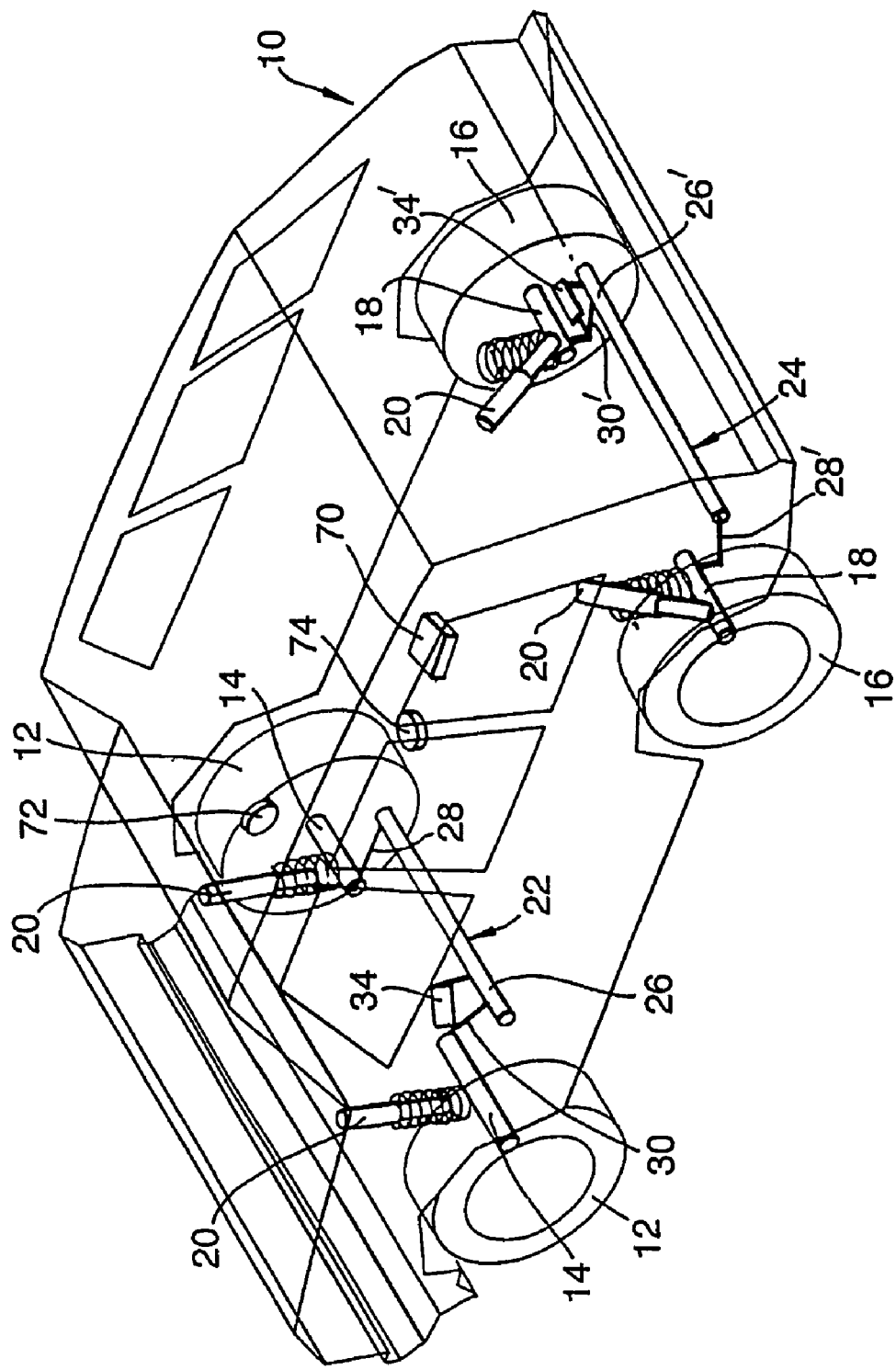
FIG. 1 is a schematic presentation of a vehicle incorporating a vehicle roll control system in accordance with the present invention.

Referring to FIG. 1, a vehicle 10 is shown schematically and comprises a pair of front wheels 12 each rotatably mounted on an axle 14, a pair of rear wheels 16 each rotatably mounted on an axle 18, and a shock absorbing system 20 associated with each wheel. A portion 22 of a vehicle roll control system in accordance with the present invention is associated with the front wheels 12, and a portion 24 of the vehicle roll control system in accordance with the present invention is associated with the rear wheels 16. The portions 22, 24 are substantially the same but with modifications made solely to allow fitting to the vehicle 10.

Figure 2:
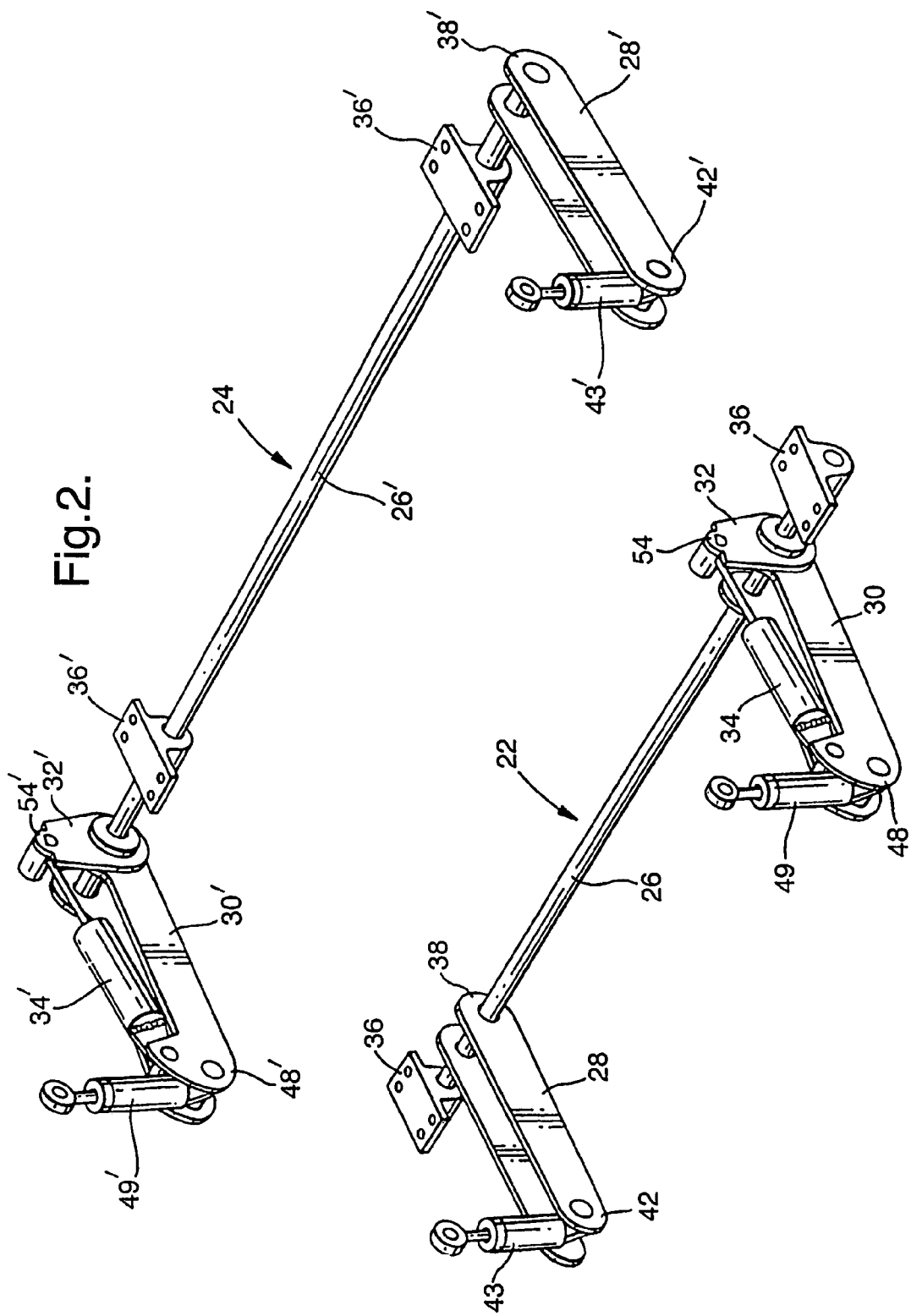
FIG. 2 is an enlarged view of the front and rear portions of the vehicle roll control system shown in FIG. 1.
Figure 3:
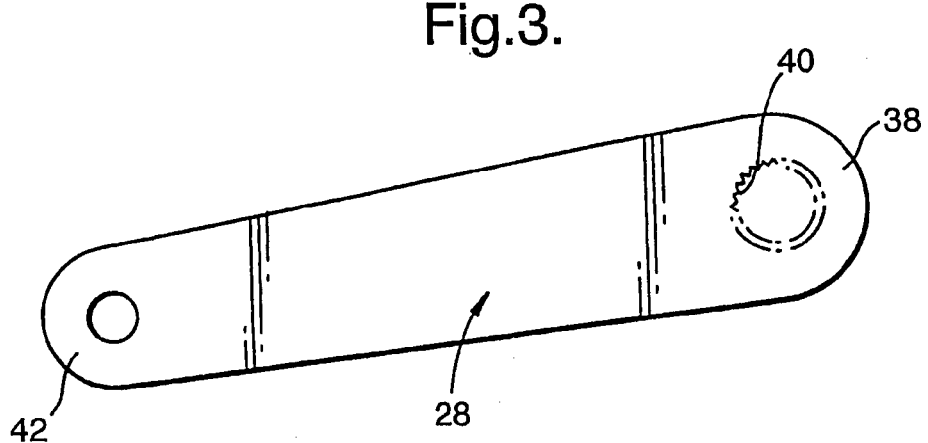
FIG. 3 is a side view of the first arm of the vehicle roll control system shown in FIG. 2.
Figure 4:
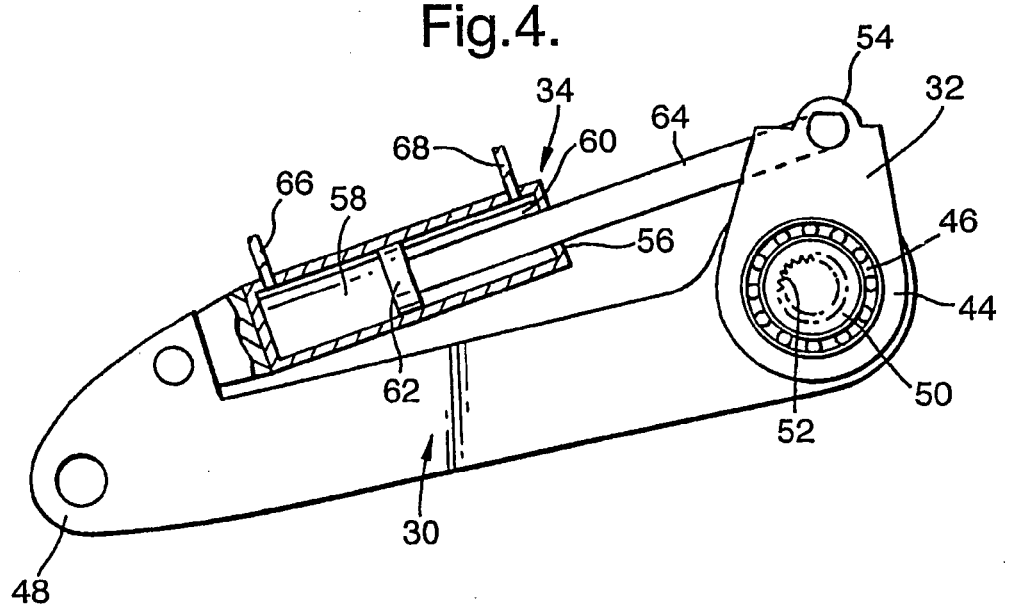
FIG. 4 is a side view of the second arm, hydraulic actuator (shown in cross-section) and lever arm of the vehicle roll control system shown in FIG. 2.

Referring in more detail to FIGS. 2 to 4, the portion 22 of the vehicle roll control system for the front of the vehicle comprises a torsion bar 26, a first arm 28, a second arm 30, a lever arm 32, and a hydraulic actuator 34. The torsion bar 26 is mounted on the vehicle by a pair of resilient mounts 36 in conventional manner to extend longitudinally between the wheels 12. The first arm 28 (FIG. 3) is fixed at one end 38 by a splined connection 40 to the torsion bar 26. The other end 42 of the first arm 28 is connected to the axle 14 of one of the front wheels 12 by a tie rod 43. The second arm 30 (FIG. 4) is rotatably mounted at one end 44 on the torsion bar 26 by way of a bearing 46. The other end 48 of the second arm 30 is connected to the axle 14 of the other front wheel 12 by a tie rod 49. The first and second arms 28,30 extend substantially parallel to one another when the vehicle is stationary, and substantially perpendicular to the torsion bar 26.

The lever arm 32 (FIG. 4) is fixed at one end 50 to the torsion bar 26 by a splined connection 52 substantially adjacent the one end 44 of the second arm 30 and the bearing 46. The lever arm 32 extends substantially perpendicular to the torsion bar 26 to a free end 54. The front hydraulic actuator 34 (FIG. 4) extends between, and is connected to, the free end 54 of the lever arm 32 and the other end 48 of the second arm 30. The front hydraulic actuator 34 comprises a housing 56 which defines first and second fluid chambers 58,60 separated by a piston 62 which makes a sealing sliding fit with the housing. As shown in FIG. 4, the housing 56 is connected to the other end 48 of the second arm 30, and the piston 62 is connected to the free end 54 of the lever arm 32 by a piston rod 64 which extends through the second fluid chamber 60. It will be appreciated that these connections may be reversed. The fluid chambers 58,60 contain hydraulic fluid and are fluidly connected to fluid lines 66, 68 respectively. The portion 24 of the vehicle roll control for the rear of the vehicle is substantially the same, but with the components (which are primed) having a different layout. The rear hydraulic actuator 34' is substantially the same as the front hydraulic actuator 34.

Figure 5:
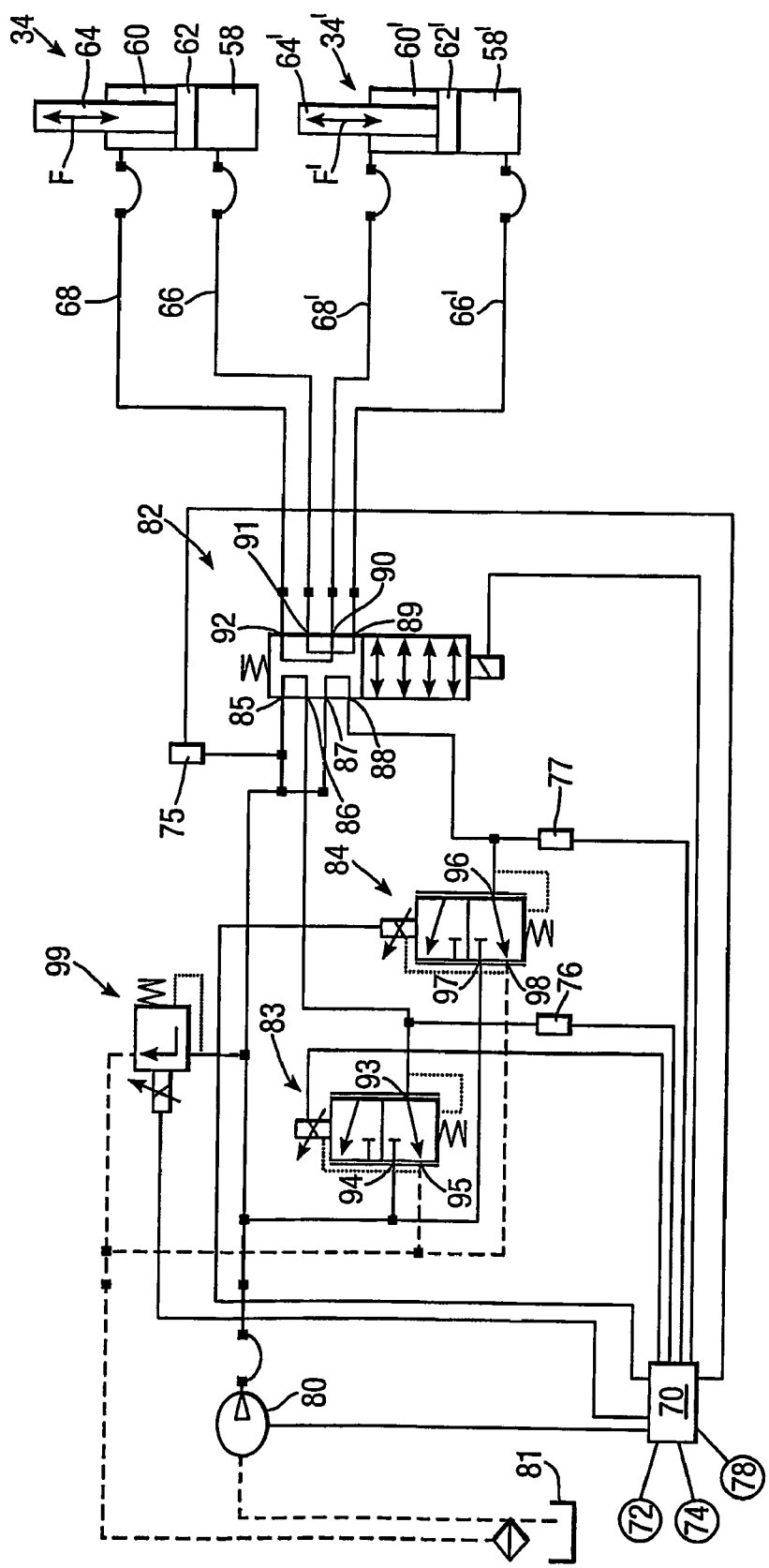
FIG. 5 is a schematic diagram of the hydraulic and electrical control circuit of the vehicle roll control system shown in FIG. 1 when the directional valve and pressure relief valves are de-actuated or in their fail-safe mode.

The hydraulic and electrical control circuit of the vehicle roll control system of FIGS. 1 to 4 is shown in FIG. 5. The hydraulic circuit includes a fluid pump 80, a fluid reservoir 81, a directional valve 82, a first pressure relief valve 83, a second pressure relief valve 84, and a pressure control valve 99. The directional valve 82 has eight ports 85-92. The first pressure relief valve 83 has three ports 93-95. The second pressure relief valve 84 has three ports 96-98. The pressure control valve 99 is fluidly connected between the pump 80 and the reservoir 81. Fluid filters may be positioned after the pump 80 and/or before the reservoir 81.

The directional valve 82 has a first port 85 fluidly connected to the fluid pump 80; a second port 86 fluidly connected to the first port 93 of the first pressure relief valve 83; a third port 87 fluidly connected to the fluid pump 80; a fourth port 88 fluidly connected to the first port 96 of the second pressure relief valve 84; a fifth port 89 fluidly connected to the first chamber 58' of the rear actuator 34' by way of fluid line 66'; a sixth port 90 fluidly connected to the second chamber 60' of the rear actuator 34' by way of fluid line 68'; a seventh port 91 fluidly connected to the first chamber 58 of the front actuator 34 by way of fluid line 66; and an eighth port 92 fluidly connected to the second chamber 60 of the front actuator 34 by way of fluid line 68. The directional valve 82 is solenoid actuated, and has a de-actuated state (shown in FIG. 5) in which the first and second ports 85,86 are fluidly connected; the third and fourth ports 87,88 are fluidly connected; the fifth and seventh ports 89,91 are fluidly connected; and the sixth and eighth ports 90,92 are fluidly connected. In the actuated state of the directional valve 82, the first and eighth ports 85,92 are fluidly connected; the second and seventh ports 86,91 are fluidly connected; the third and sixth ports 87,90 are fluidly connected; and the fourth and fifth ports 88,89 are fluid connected. In an alternative arrangement, the directional valve 82 may be hydraulically actuated by first and second pilot (on/off) valves (not shown).

The second port 94 of the first pressure relief valve 83 is fluidly connected to the pump 80. The third port 95 of the first pressure relief valve 83 is fluidly connected to the reservoir 81. In the de-actuated state of the first pressure relief valve 83 (shown in FIG. 5), the first port 93 is fluidly connected to the third port 95, and the second port 94 is fluidly isolated. In the actuated state of the first pressure relief valve 83, the first port 93 is fluidly connected to the second port 94, and the third port 95 is fluidly isolated.

The second port 97 of the second pressure relief valve 84 is fluidly connected to the pump 80. The third port 98 of the second pressure relief valve 84 is fluidly connected to the reservoir 81. In the de-actuated state of the second pressure relief valve 84 (shown in FIG. 5), the first port 96 is fluidly connected to the third port 98, and the second port 97 is fluidly isolated. In the actuated state of the second pressure relief valve 84, the first port 96 is fluidly connected to the second port 97, and the third port 98 is fluidly isolated.

The first and second pressure relief valves 83,84 are preferably solenoid actuated as shown in FIG. 5. Alternatively, the pressure relief valves 83,84 may be hydraulically actuated by first and second pilot (on/off) valves (not shown).

The pump 80 may be driven by the vehicle engine and hence continuously actuated. Alternatively, the pump 80 may be driven by an electric motor or any other suitable means, either continuously, or variably. The pressure control valve 99 is actuated to adjust the fluid pressure in the hydraulic system between a predetermined minimum pressure and a predetermined maximum pressure. The pressure control valve 99 is also actuated to adjust the pressure differential between the first and second chambers 58, 58',60, 60' of the hydraulic actuators 34,34' respectively (when the directional valve 82 and pressure relief valves 83,84 are also actuated as required).

The electrical control circuit includes an electronic and/or computerised control module 70. The control module 70 operates the fluid pump 80, the directional valve 82, the pressure control valve 99, and the pressure relief valves 83,84, when required. The control module 70 actuates the valves 82-84,99 dependent on predetermined vehicle conditions which are determined by signals from one or more sensors, such as a first pressure sensor 76 (which detects the fluid pressure associated with the first chamber 58 of the front hydraulic actuator 34), a second pressure sensor 77 (which detects the fluid pressure associated with the first chamber 58' of the rear hydraulic actuator 34'), a third pressure sensor 75 (which detects the fluid pressure associated with the second chambers 60,60' of the actuators 34,34'), a lateral g sensor 74 (which monitors the sideways acceleration of the vehicle), a steering sensor 72 (which monitors the steering angle of the front wheels 12), a vehicle speed sensor 78, and/or any other relevant parameter.

If the control module 70 detects that roll control is required (due, for example, to cornering of the motor vehicle 10), the control module determines if the module has to generate a force F, F' which acts on the piston rods 64,64' respectively to extend the front and/or rear actuators 34,34', or to compress the front and/or rear actuators, in an axial direction. In the present invention, the force F on the front actuator 34 may be different from the force F' on the rear actuator 34' dependent on the actuation of the pressure relief valves 83,84; and the value of the pressure differential is set by the pressure control valve 99.

In this embodiment, the roll control system can be operated in four different modes when the directional valve 82 is actuated and the pressure control valve 99 is actuated. In a first mode, when the first pressure relief valve 83 is actuated and the second pressure relief valve 84 is de-actuated, the second fluid chambers 60, 60' of the front and rear hydraulic actuators 34, 34' are at substantially the same pressure, the first fluid chamber 58 of the front hydraulic actuator is at a pressure which is substantially equal to or less than the pressure in the second chambers dependent on the pressure relief valve 83, and the first fluid chamber 58' of the rear hydraulic actuator is at a different pressure. In a second mode, when the first pressure relief valve 83 is de-actuated and the second pressure relief valve 84 is actuated, the second fluid chambers 60, 60' of the front and rear hydraulic actuators 34, 34' are at substantially the same pressure, the first fluid chamber 58' of the rear hydraulic actuator is a pressure which is substantially equal to or less than the pressure in the second chambers dependent on the pressure relief valve 84, and the first fluid chamber 58 of the front hydraulic actuator is at a different pressure. In a third mode, when the pressure relief valves 83, 84 are de-actuated, the first fluid chambers 58, 58' of the hydraulic actuators 34, 34' are at substantially the same pressure, and the second fluid chambers 60, 60' of the hydraulic actuators are at substantially the same pressure but at a different pressure to the first fluid chambers. In a fourth mode, when the pressure relief valves 83, 84 are actuated, the second fluid chambers 60,60' of the front and rear hydraulic actuators 34, 34' are at substantially the same pressure, the first fluid chamber 58 of the front hydraulic actuator is at a pressure which is substantially equal to or less than the pressure in the second chambers dependent on the pressure relief valve 83, and the first fluid chamber 58' of the rear hydraulic actuator is at a pressure which is substantially equal to or less than the pressure in the second chambers dependent on the pressure relief valve 84. Also, in this fourth mode, the pressures in the first chambers 58, 58' may be different from one another dependent on the pressure relief valves 83, 84. In all of the above modes, the value of any pressure differential is control by the pressure control valve 99 and the pressure relief valves 83, 84. This arrangement provides improvement management of the compression or expansion of the hydraulic actuators, and hence provides improved roll control of the vehicle.

Figure 6:
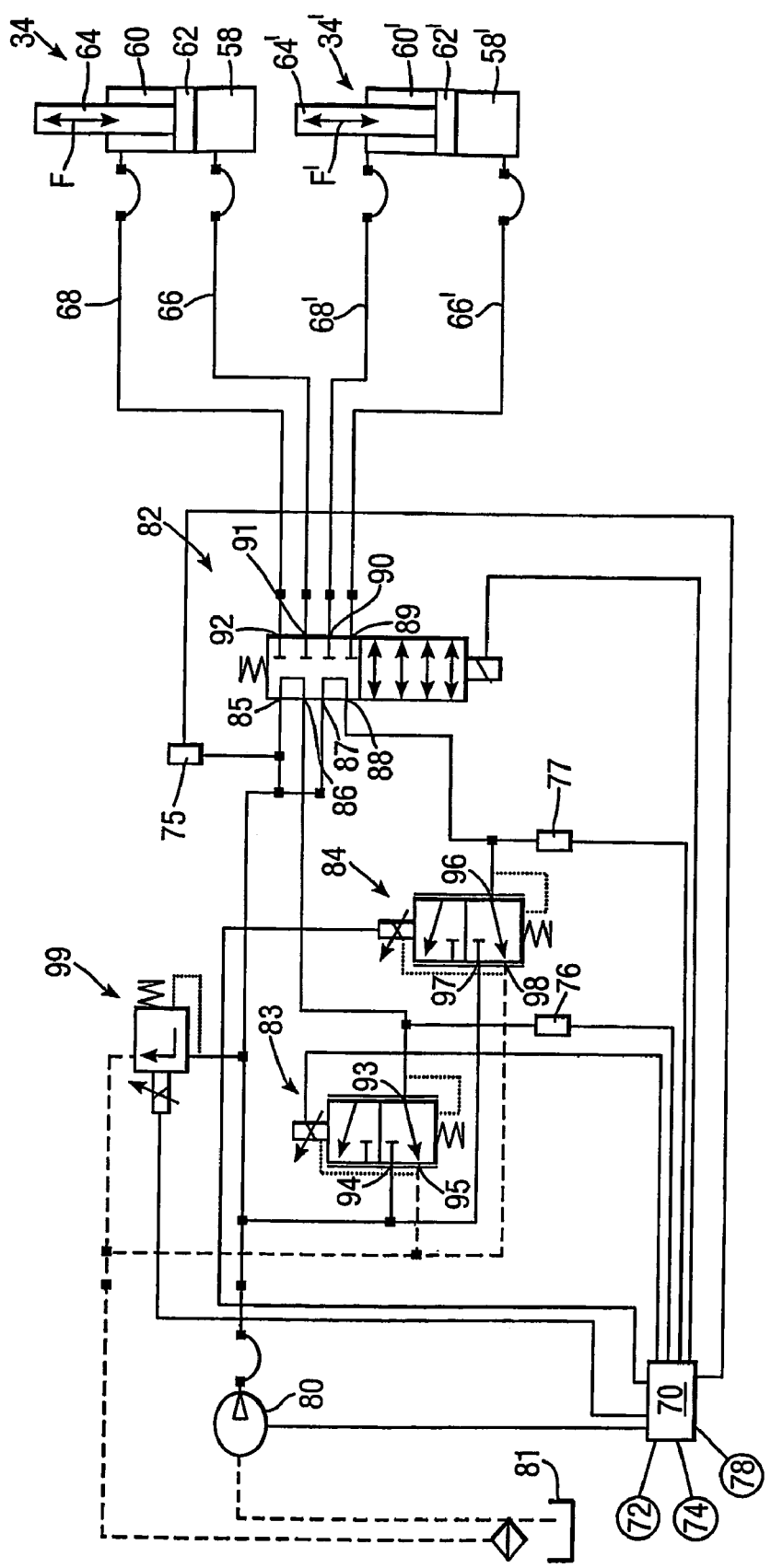
FIG. 6 is a schematic diagram of a first alternative hydraulic and electrical control circuit of the vehicle roll control system shown in FIG. 1 when the directional valve and the pressure relief valves are de-actuated or in their fail-safe mode.

FIG. 6 illustrates a first alternative of the hydraulic and electrical control circuit of the vehicle roll control system shown in FIGS. 1 to 4. FIG. 6 is a modification of the hydraulic circuit shown in FIG. 5, in which changes have been made to the directional valve 82. In this alternative, in the de-actuated state of the directional valve 82, the fifth, sixth, seventh and eighth ports 89-92 are fluidly isolated from one another and from the other ports 85-88. The operation of this first alternative is substantially the same as the operation of the arrangement shown in FIG. 5.

Figure 7:
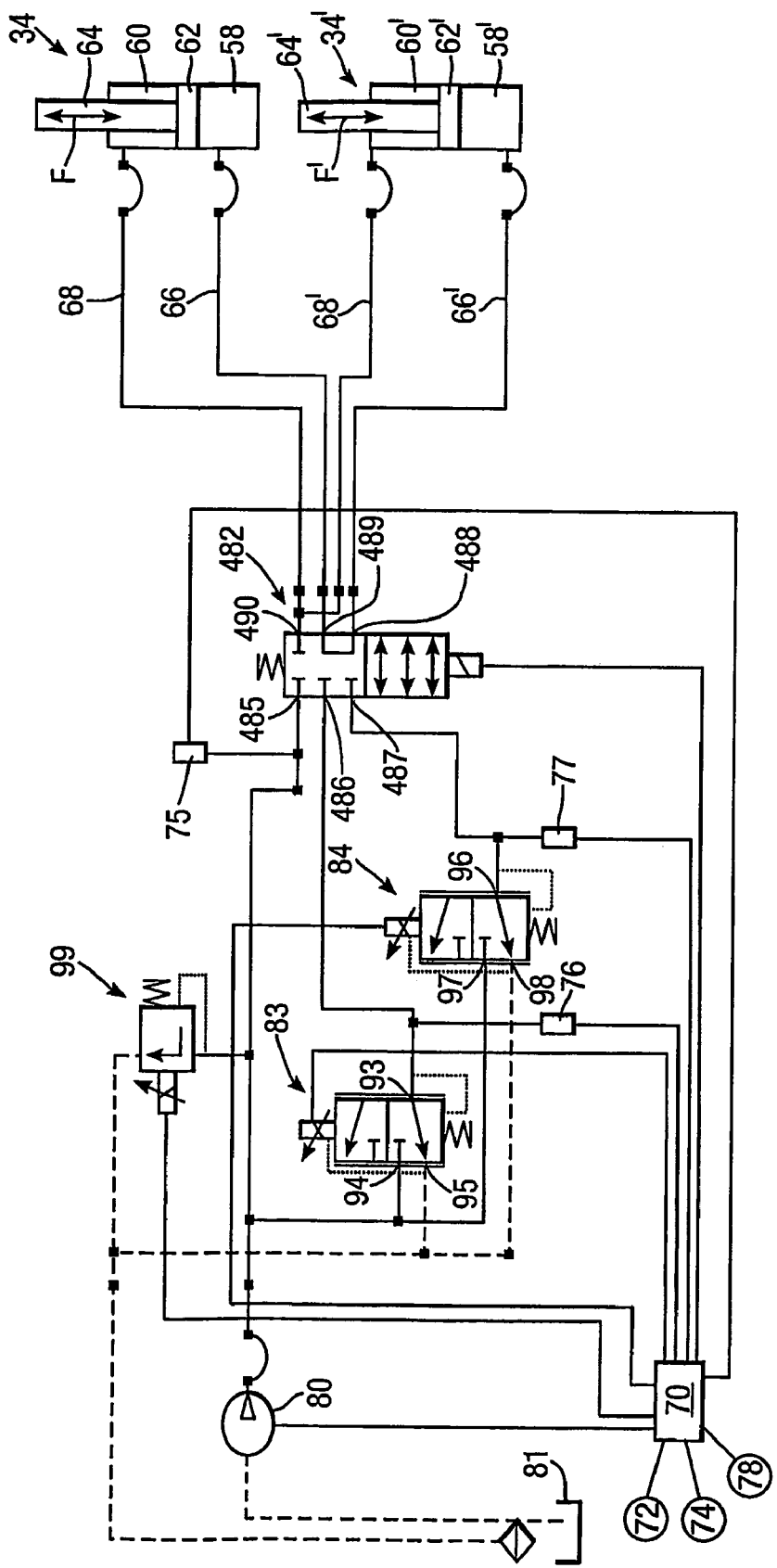
FIG. 7 is a schematic diagram of a second alternative hydraulic and electrical control circuit of the vehicle roll control system shown in FIG. 1 when the directional valve and the pressure relief valves are de-actuated or in their fail-safe mode.

FIG. 7 illustrates a second alternative of the hydraulic and electrical control circuit of the vehicle roll control system shown in FIGS. 1 to 4. FIG. 7 is a modification of the hydraulic circuit shown in FIG. 5, in which changes have been made to the directional valve 482. In this alternative, the directional valve 482 comprises six ports, a first port 485, a second port 486, a third port 487, a fourth port 488, a fifth port 489 and a sixth port 490. The first port 485 is fluidly connected to the pump 80. The second port 486 is fluidly connected to the first port 93 of the first pressure relief valve 83. The third port 487 is fluidly connected to the first port 96 of the second pressure relief valve 84. The fourth port 488 is fluidly connected to the first fluid chamber 58' of the rear actuator 34'. The fifth port 489 is fluidly connected to the first fluid chamber 58 of the front actuator 34. The sixth port 490 is fluidly connected to the second fluid chambers 60, 60' of the front and rear actuators 34, 34'. In the de-actuated state of the directional valve 482, the first, second, third and sixth ports 485-487, 490 are fluidly isolated from one another and from the other ports 488, 489 (which are fluidly connected). The operation of this second alternative is substantially the same as the operation of the arrangement shown in FIG. 5.

Figure 7A:
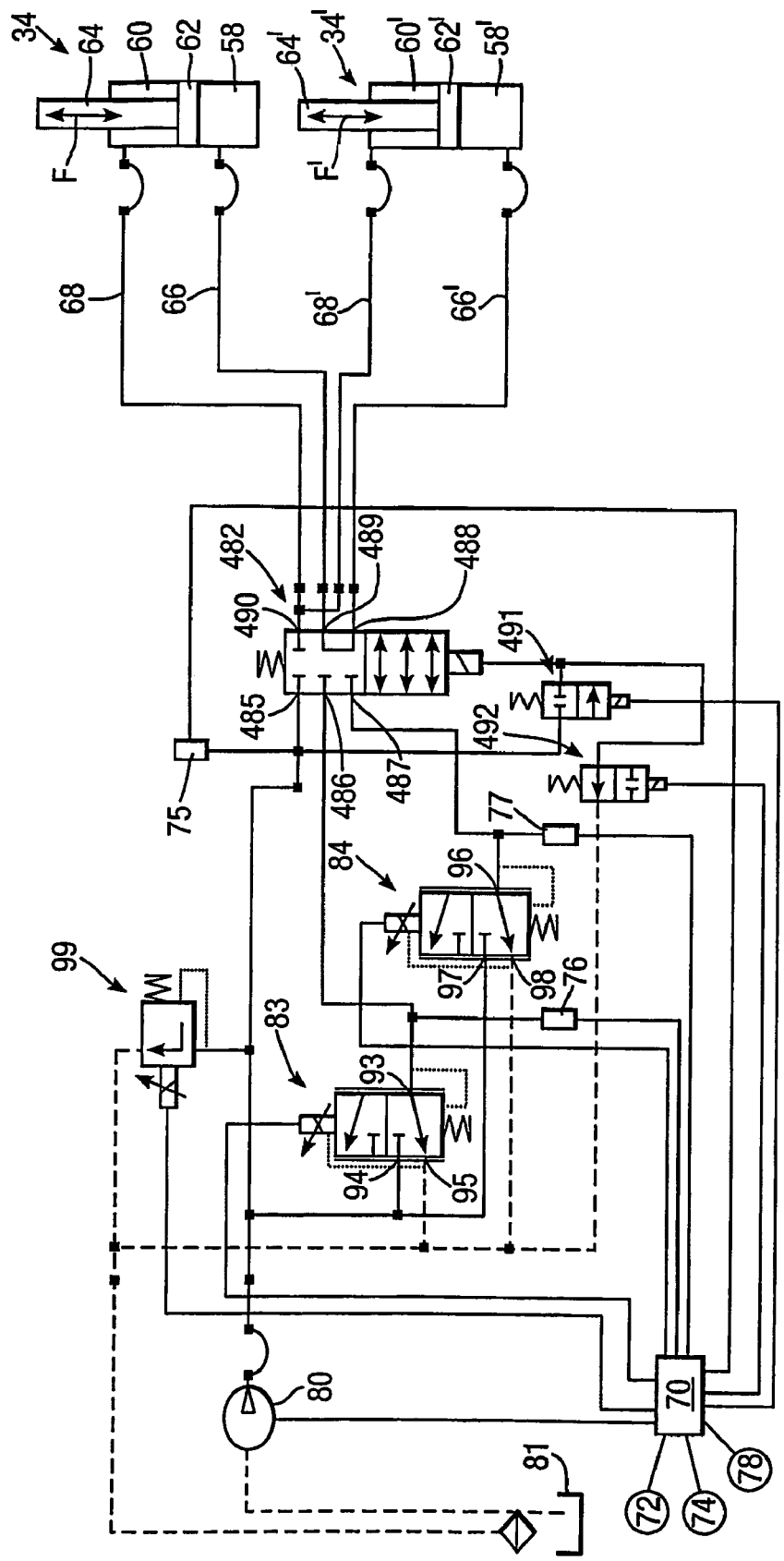
FIG. 7A is a schematic diagram of a third alternative hydraulic and electrical control circuit of the vehicle roll control system shown in FIG. 1 when the directional valve and the pressure relief valves are de-actuated or in their fail-safe mode.

FIG. 7A illustrates a third alternative of the hydraulic and electrical control circuit of the vehicle roll control system shown in FIGS. 1 to 4. FIG. 7A is a modification of the hydraulic and electrical circuit shown in FIG. 7, in which changes have been made to the operation of the directional valve 482'. In this alternative, the directional valve 482' is hydraulically actuated (rather than solenoid actuated) by first and second pilot (on/off) valves 491, 492. The pilot valve 491, 492 are fluidly connected in series between the pump 80 and the reservoir 81. The actuator 493 for the directional valve 482' is fluidly connected to the flow path between the pilot valves 491, 492. The operation of the pilot valves 491, 492 is controlled by the control module 70. Other than the actuation of the directional valve 482' by the pilot valves 491, 492, the operation of this third alternative is substantially the same as the operation of the arrangement shown in FIG. 5.

Figure 8:
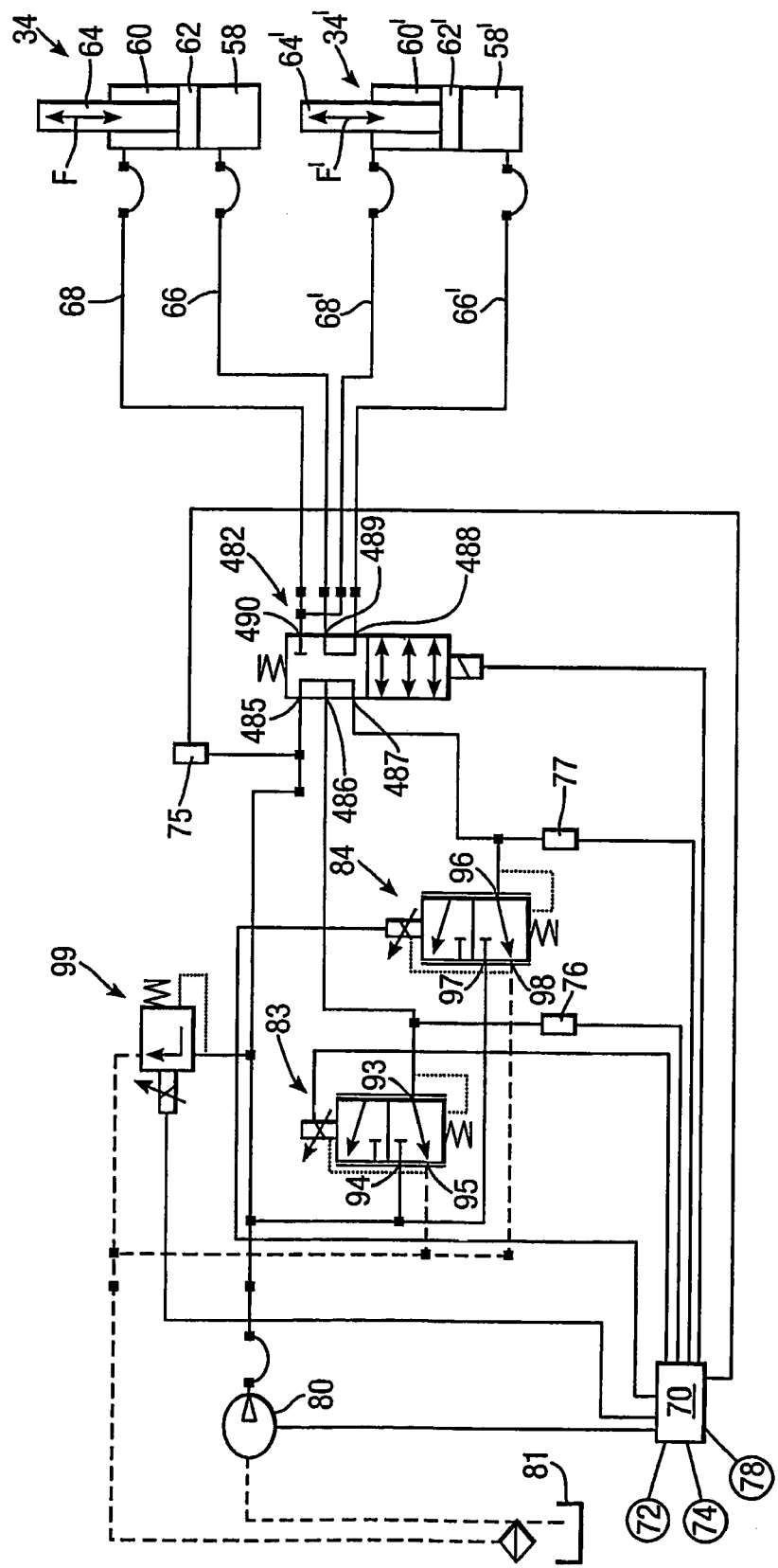
FIG. 8 is a schematic diagram of a fourth alternative hydraulic and electrical control circuit of the vehicle roll control system shown in FIG. 1 when the directional valve and the pressure relief valves are de-actuated or in their fail-safe mode.

FIG. 8 illustrates a fourth alternative of the hydraulic and electrical control circuit of the vehicle roll control system shown in FIGS. 1 to 4. FIG. 8 is a modification of the hydraulic circuit shown in FIG. 7, in which changes have been made to the directional valve 482. In this alternative, in the de-actuated state of the directional valve 482, the first, second and third ports 485-487 are fluidly connected to one another. The operation of this fourth alternative is substantially the same as the operation of the arrangement shown in FIG. 5.

Figure 8A:
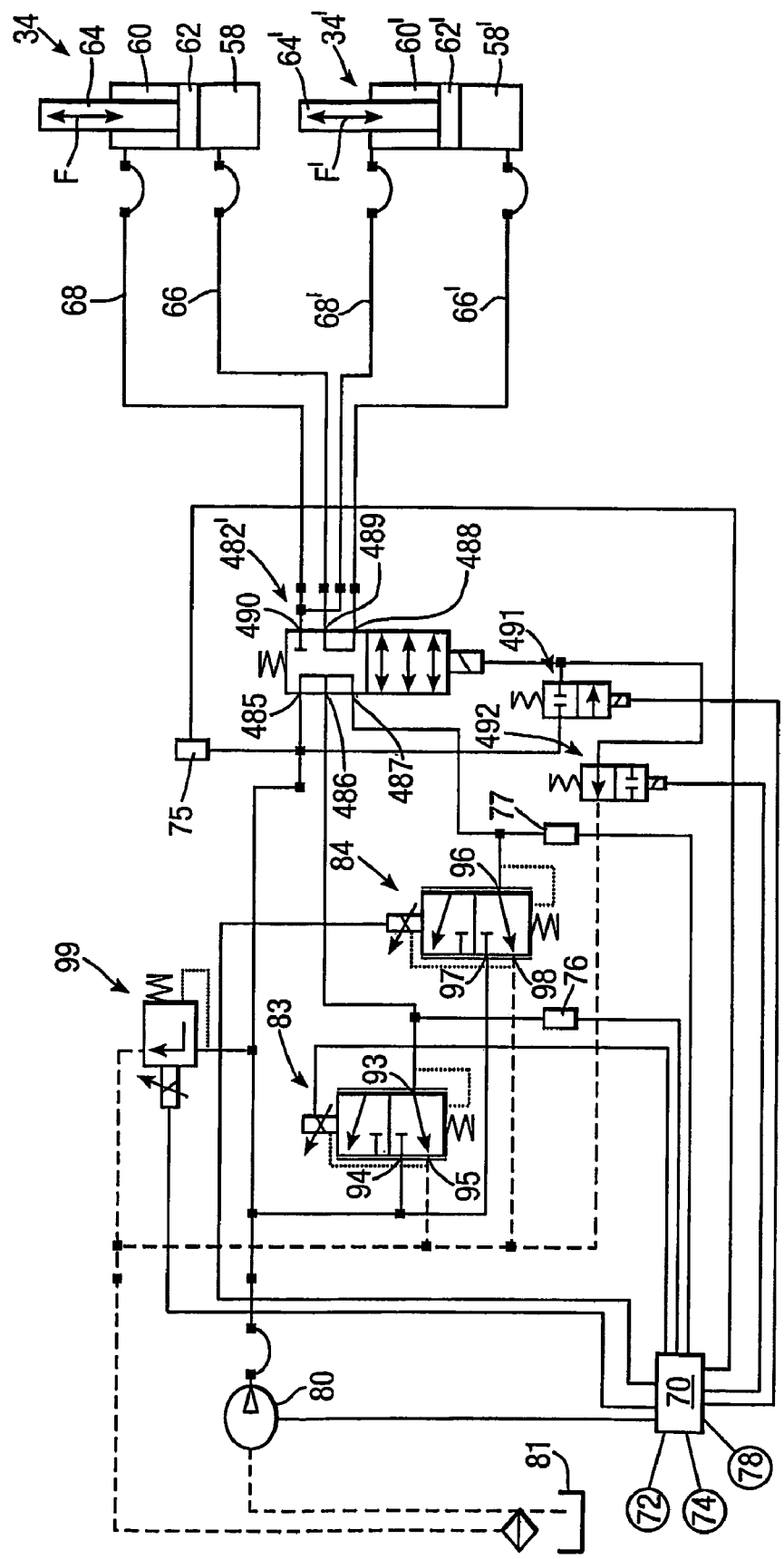
FIG. 8A is a schematic diagram of a fifth alternative hydraulic and electrical control circuit of the vehicle roll control system shown in FIG. 1 when the directional valve and the pressure relief valves are de-actuated or in their fail-safe mode.

FIG. 8A illustrates a fifth alternative of the hydraulic and electrical control circuit of the vehicle roll control system shown in FIGS. 1 to 4. FIG. 8A is a modification of the hydraulic and electrical circuit shown in FIG. 8, in which changes have been made to the operation of the directional valve 482'. In this alternative, the directional valve 482' is hydraulically actuated (rather than solenoid actuated) by first and second pilot (on/off) valves 491, 492. The pilot valve 491, 492 are fluidly connected in series between the pump 80 and the reservoir 81. The actuator 493 for the directional valve 482' is fluidly connected to the flow path between the pilot valves 491, 492. The operation of the pilot valves 491, 492 is controlled by the control module 70. Other than the actuation of the directional valve 482' by the pilot valves 491, 492, the operation of this fifth alternative is substantially the same as the operation of the arrangement shown in FIG. 5.

Figure 9:
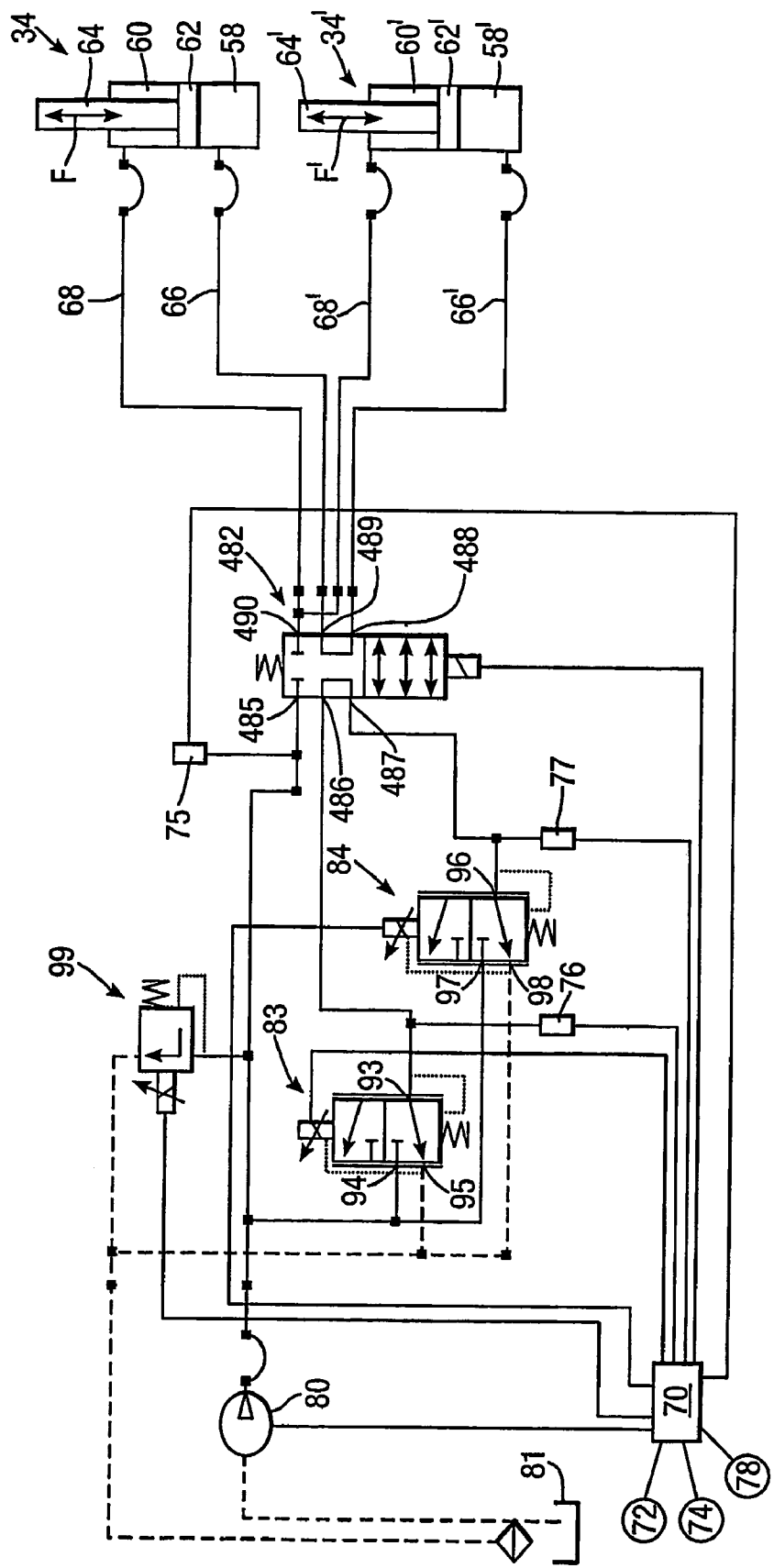
FIG. 9 is a schematic diagram of a sixth alternative hydraulic and electrical control circuit of the vehicle roll control system shown in FIG. 1 when the directional valve and the pressure relief valves are de-actuated or in their fail-safe mode.

FIG. 9 illustrates a sixth alternative of the hydraulic and electrical control circuit of the vehicle roll control system shown in FIGS. 1 to 4. FIG. 9 is a modification of the hydraulic circuit shown in FIG. 7, in which changes have been made to the directional valve 482. In this alternative, in the de-actuated state of the directional valve 482, the second and third ports 485-487 are fluidly connected to one another, whilst the first and sixth ports 485, 490 are fluidly isolated. The operation of this sixth alternative is substantially the same as the operation of the arrangement shown in FIG. 5.

Figure 9A:
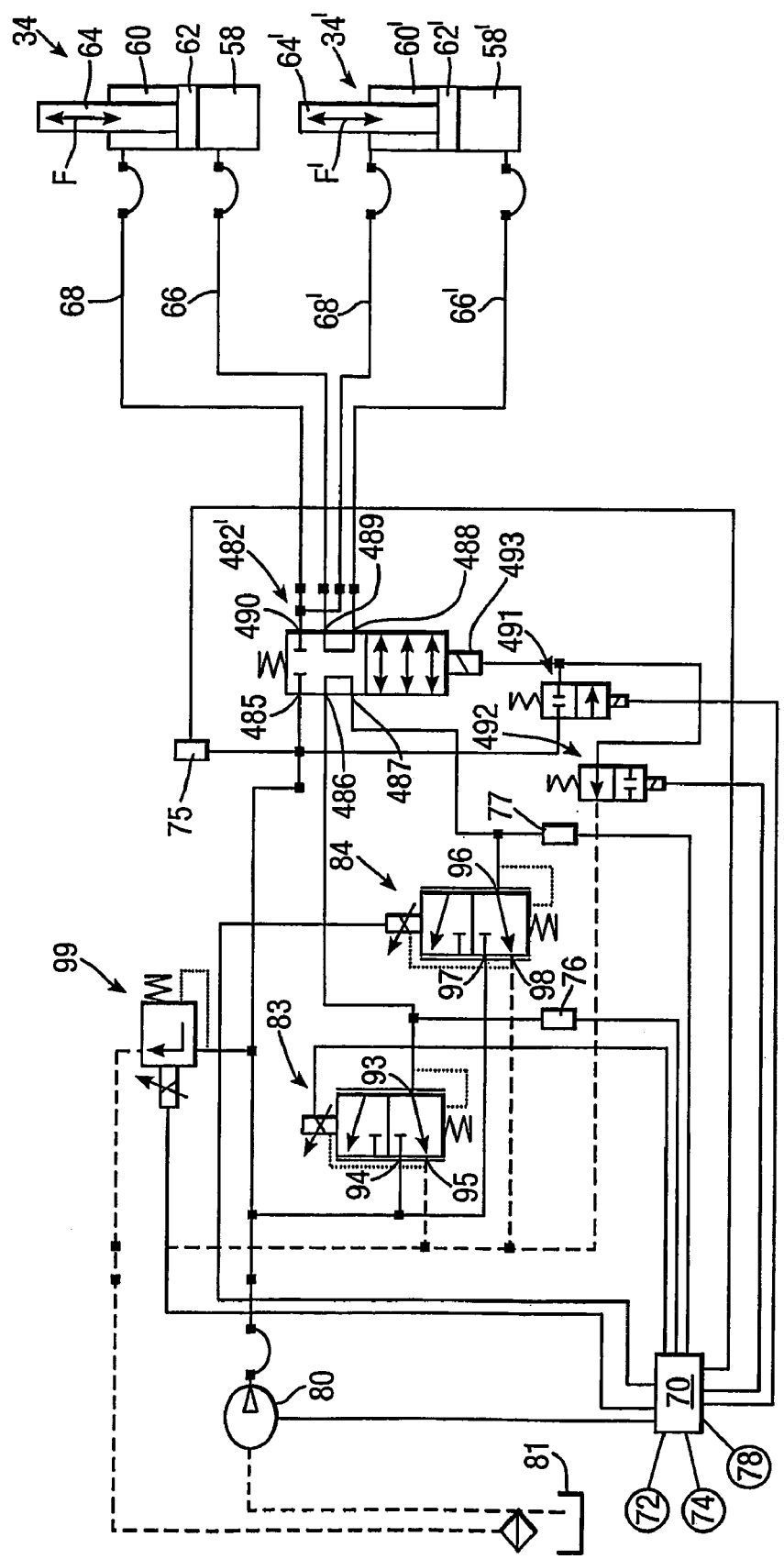
FIG. 9A is a schematic diagram of a seventh alternative hydraulic and electrical control circuit of the vehicle roll control system shown in FIG. 1 when the directional valve and the pressure relief valves are de-actuated or in their fail-safe mode.

FIG. 9A illustrates a seventh alternative of the hydraulic and electrical control circuit of the vehicle roll control system shown in FIGS. 1 to 4. FIG. 9A is a modification of the hydraulic and electrical circuit shown in FIG. 9, in which changes have been made to the operation of the directional valve 482'. In this alternative, the directional valve 482' is hydraulically actuated (rather than solenoid actuated) by first and second pilot (on/off) valves 491, 492. The pilot valve 491, 492 are fluidly connected in series between the pump 80 and the reservoir 81. The actuator 493 for the directional valve 482' is fluidly connected to the flow path between the pilot valves 491, 492. The operation of the pilot valves 491, 492 is controlled by the control module 70. Other than the actuation of the directional valve 482' by the pilot valves 491, 492, the operation of this seventh alternative is substantially the same as the operation of the arrangement shown in FIG. 5.

The above-described embodiments all operate in substantially the same way, but provide different hydraulic circuit arrangements for their respective fail-safe modes, as illustrated in the drawings. Also, the selection is dependent on the type of hydraulic actuator that is used.

Figure 10:
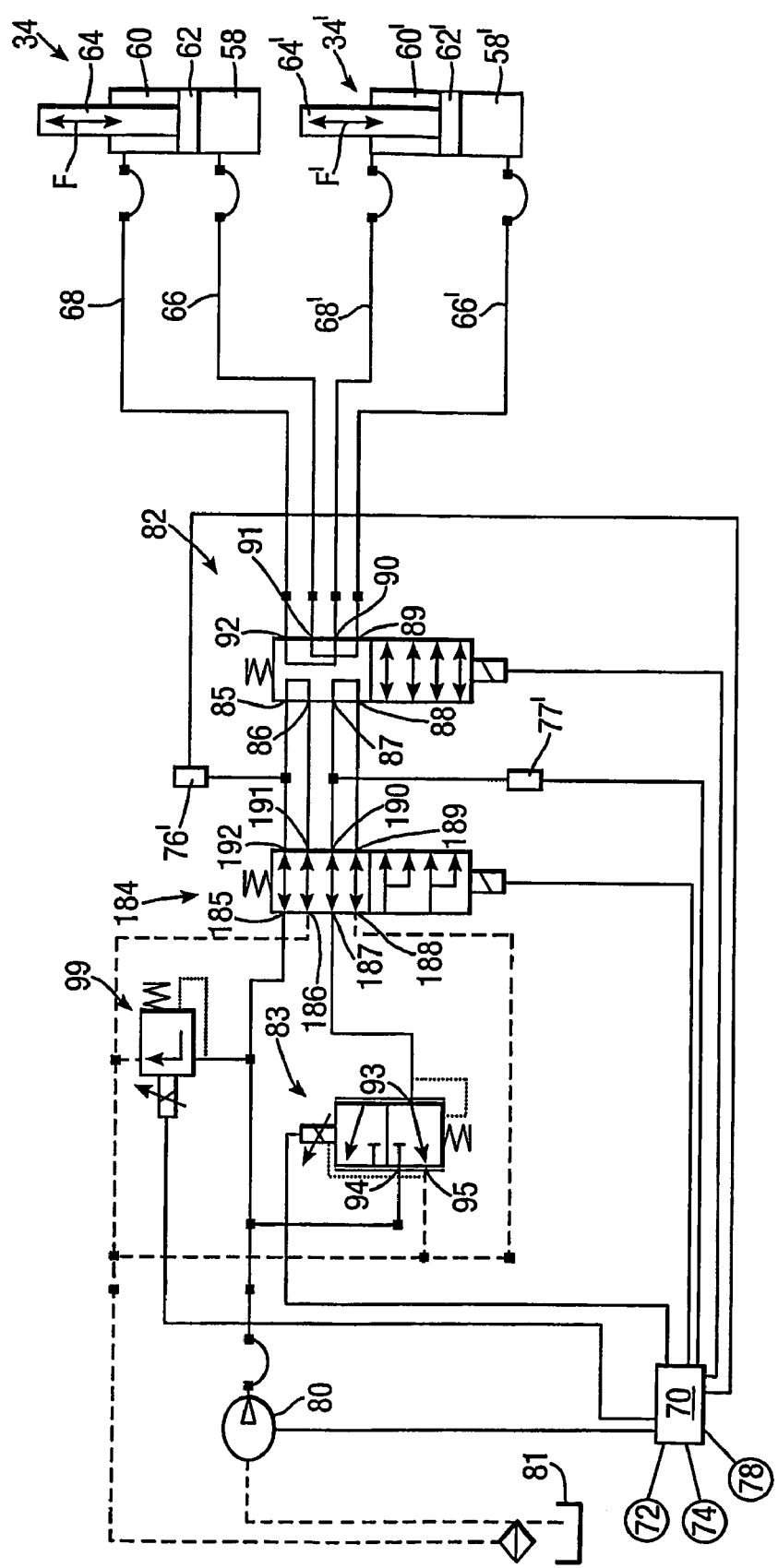
FIG. 10 is a schematic diagram of an eighth alternative hydraulic and electrical control circuit of the vehicle roll control system shown in FIG. 1 when the directional valves and the pressure relief valve are de-actuated or in their fail safe mode.

FIG. 10 illustrates an eighth alternative of the hydraulic and electrical control circuit of the vehicle roll control system shown in FIGS. 1 to 4. FIG. 10 is a modification of the hydraulic circuit shown in FIG. 5, in which the second pressure relief valve has been removed, and a second directional valve 184 is positioned between the first directional valve 82 and the pump 80 and reservoir 81.

The second directional valve 184 has a first port 185 fluidly connected to the fluid pump 80; a second port 186 fluidly connected to the reservoir 81; a third port 187 fluidly connected to the first port 93 of the pressure relief valve 83; a fourth port 188 fluidly connected to the reservoir 81; a fifth port 189 fluidly connected to the fourth port 88 of the first directional valve 82; a sixth port 190 fluidly connected to the third port 87 of the first directional valve 82; a seventh port 191 fluidly connected to the second port 86 of the first directional valve 82; and an eighth port 192 fluidly connected to the first port 85 of the first directional valve 82. The second directional valve 184 is solenoid actuated, and has a de-actuated state (shown in FIG. 10) in which the first and eighth ports 185,192 are fluidly connected; the second and seventh ports 186,191 are fluidly connected; the third and sixth ports 187,190 are fluidly connected; and the fourth and fifth ports 188,189 are fluidly connected. In the actuated state of the second directional valve 184, the first, seventh and eighth ports 185,191,192 are fluidly connected; the third, fifth and sixth ports 187,189,190 are fluidly connected; and the second and fourth ports 186,188 are fluidly isolated.

Also, in this eighth alternative, there are only two pressure sensors 76',77'. The first pressure sensor 76' detects the fluid pressure. associated with the front hydraulic actuator 34, and a second pressure sensor 77' detects the fluid pressure associated with the rear hydraulic actuator 34'.

In this embodiment, the roll control system can be operated in four different modes when the directional valve 82 is actuated. In a first mode, when the first pressure relief valve 83 is de-actuated and the second directional valve 184 is de-actuated, the first and second fluid chambers 58', 60' of the rear hydraulic actuator 34' and the first fluid chamber 58 of the front hydraulic actuator 34 are at substantially the same pressure, and the second fluid chamber 60 of the front hydraulic actuator is at a different pressure. In a second mode, when the first pressure relief valve 83 is actuated and the second differential valve 184 is de-actuated, the first fluid chambers 58, 58' of the front and rear hydraulic actuators 34, 34' are at substantially the same pressure, the second fluid chamber 60 of the front hydraulic actuator is at a different pressure to the first fluid chambers, and the second fluid chamber 60' of the rear hydraulic actuator is a pressure which is substantially equal to or less than the pressure in the second chamber of the front hydraulic actuator dependent on the pressure relief valve 83. In a third mode, when the pressure relief valve 83 is de-actuated and the second direction valve 184 is actuated, the first and second fluid chambers 58, 60 of the front hydraulic actuator 34 are at substantially the same pressure, and the first and second fluid chambers 58', 60' of the rear hydraulic actuator 34' are at substantially the same pressure but at a different pressure to the fluid chambers of the front actuator. In a fourth mode, when the pressure relief valve 83 and the second directional valve 184 are actuated, the first and second fluid chambers 58, 60 of the front hydraulic actuator 34 are at substantially the same pressure, and the first and second fluid chambers 58',60' of the rear hydraulic actuator 34' are at substantially the same pressure which is substantially the same as or less than the pressure in the fluid chambers of the front actuator dependent on the pressure relief valve 83. In the above modes, the value of any pressure differential is control by the pressure control valve 99 and the pressure relief valve 83. This arrangement provides improvement management of the compression or expansion of the hydraulic actuators, and hence provides improved roll control of the vehicle.

Although the directional valves 82, 184 are shown as solenoid actuated, these valves may, as an alternative, be hydraulically actuated by pilot (on/off) valves.

Figure 11:
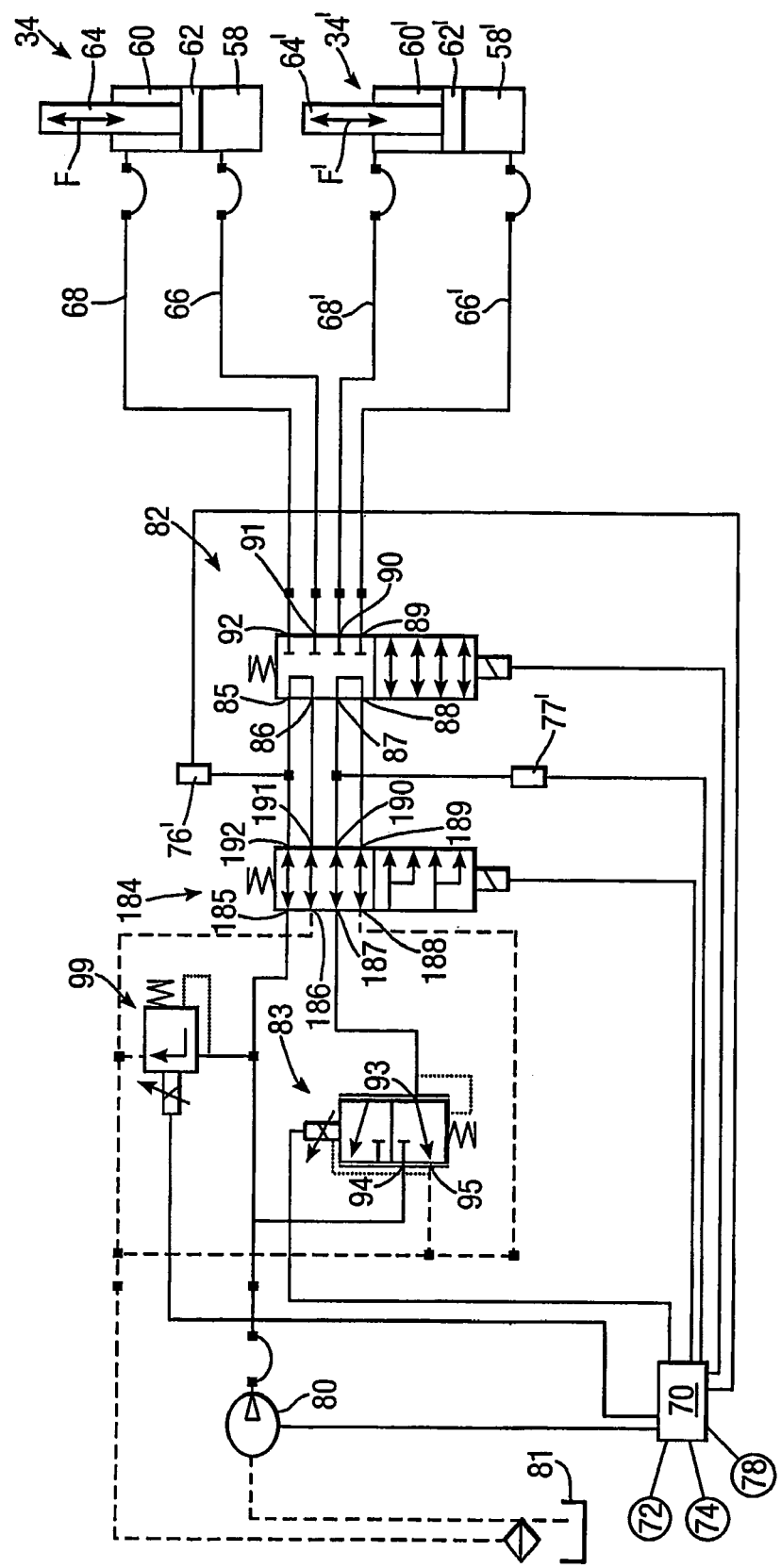
FIG. 11 is a schematic diagram of a ninth alternative hydraulic and electrical control circuit of the vehicle roll control system shown in FIG. 1 when the directional valves and the pressure relief valve are de-actuated or in their fail safe mode.

FIG. 11 illustrates a ninth alternative of the hydraulic and electrical control circuit of the vehicle roll control system shown in FIGS. 1 to 4. FIG. 11 is a modification of the hydraulic circuit shown in FIG. 11, in which changes have been made to the first directional valve 82. In this alternative, in the de-actuated state of the first directional valve 82, the fifth, sixth, seventh and eighth ports 89-92 are fluidly isolated from one another and from the other ports 85-88. The operation of this ninth alternative is substantially the same as the operation of the arrangement shown in FIG. 10.

The above-described embodiments of FIGS. 10 and 11 both operate in substantially the same way, but provide different hydraulic circuit arrangements for their respective fail-safe modes, as illustrated in the drawings. Also, the selection is dependent on the type of hydraulic actuator that is used.

In the present invention, in all of the above embodiments, the valves of the hydraulic circuit are actuable to provide fluid pressure to the first fluid chamber of the front hydraulic actuator which is different from the fluid pressure provided to the first fluid chamber of the rear hydraulic actuator; and/or actuable to provide fluid pressure to the second fluid chamber of the front hydraulic actuator which is different from the fluid pressure provided to second fluid chamber of the rear hydraulic actuator.

Figure 12:
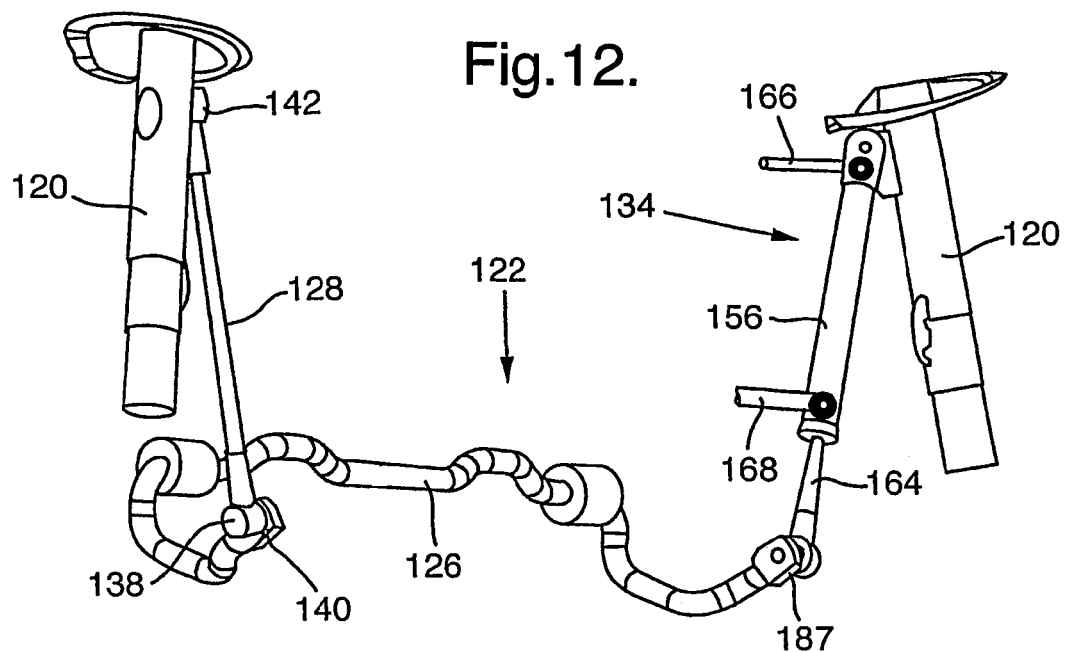
FIG. 12 is a view of a portion of a vehicle roll control system in accordance with a second embodiment of the present invention.

The present invention is also applicable for use with a vehicle roll control system, the front portion 122 of which is as shown in FIG. 12 and the rear portion of which is substantially identical to the front portion. In this embodiment in accordance with the present invention, the front portion 122 comprises a torsion bar 126, a first arm 128, and a hydraulic actuator 134. The first arm 128 is fixed at one end 138 to one end 140 of the torsion bar 126. The other end 142 of the first arm 128 is connected to one of the shock absorbers 120. The hydraulic actuator 134 has a piston rod 164 which is fixed to the other end 187 of the torsion bar 126. The housing 156 of the actuator 134 is connected to the other shock absorber 120. The hydraulic actuator 134 is substantially the same as the actuator 34 described above with reference to FIGS. 1 to 5, and has a fluid line 166 connected to a first fluid chamber inside the housing, and another fluid line 168 connected to a second fluid chamber inside the housing. The first and second fluid chambers inside the housing 156 are separated by a piston secured to the piston rod 164. The fluid lines 166,168 for each hydraulic actuator are connected to a hydraulic circuit as shown in FIG. 5, which is controlled by a control circuit as shown in FIG. 5, or any one of the arrangements shown in FIGS. 6 to 11. The roll control system is operated in substantially the same manner as that described above with reference to FIGS. 1 to 5, or any one of FIGS. 6 to 11.

Figure 13:
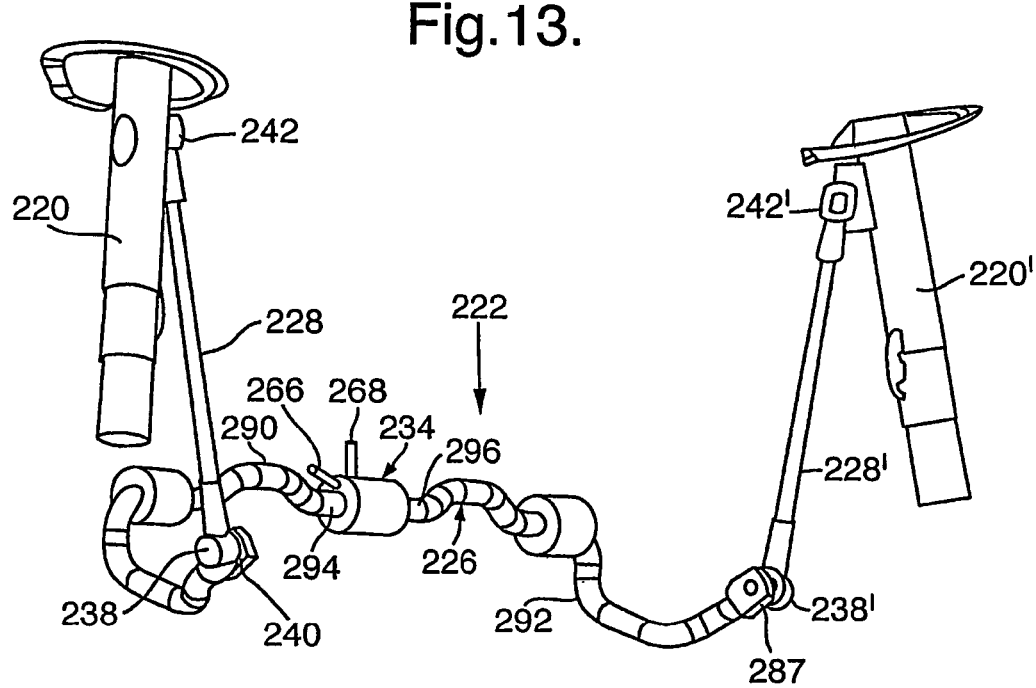
FIG. 13 is a view of a portion of a vehicle roll control system in accordance with a third embodiment of the present invention.

The present invention is also applicable for use with a vehicle roll control system as shown in FIG. 13. In this third embodiment in accordance with the present invention, the front portion 222 of the system comprises a torsion bar 226, a first arm 228, a second arm 228', and a hydraulic actuator 234. The rear portion of the system is substantially identical. The first arm 228 is fixed at one end 238 to one end 240 of the torsion bar 226. The other end 242 of the first arm 228 is connected to one of the shock absorbers 220. The second arm 228' is fixed at one end 238' to the other end 287 of the torsion bar 226. The other end 242' of the second arm 228' is connected to the other shock absorber 220'. The torsion bar 226 is split into first and second parts 290,292, respectively. The first and second parts 290,292 of the torsion bar 226 have portions 294,296, respectively, which are axially aligned. The axially aligned portions 294,296 are connected by a hydraulic actuator 234.

Figure 14:
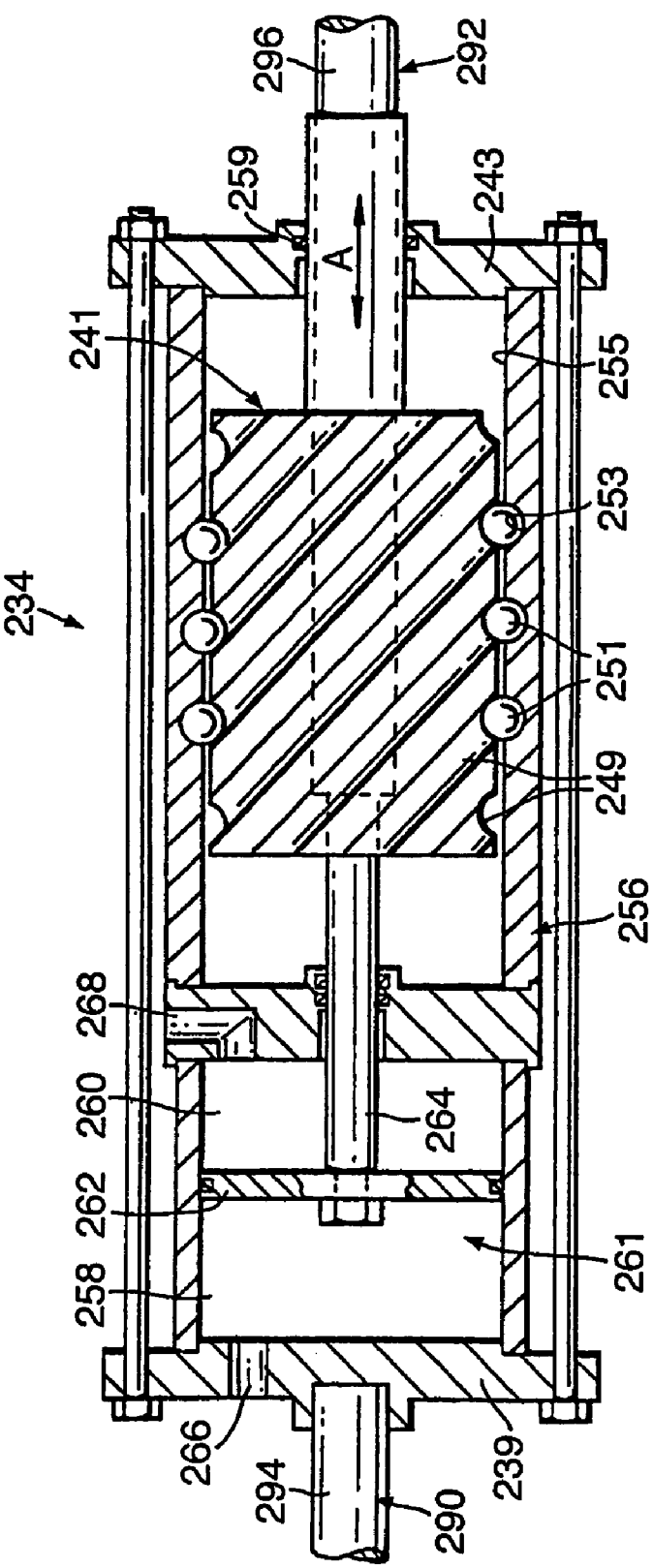
FIG. 14 is a cross-section view of the hydraulic actuator of the vehicle roll control system of FIG. 13.

The hydraulic actuator 234, as shown in FIG. 14, comprises a cylindrical housing 256 which is connected at one end 239 to the portion 294 of the first part 290 of the torsion bar 226. The actuator 234 further comprises a rod 241 positioned inside the housing 256, extending out of the other end 243 of the housing, and connectable to the portion 296 of the second part 292 of the torsion bar 226. The rod 241 has an external screw thread 249 adjacent the housing 256. Balls 251 are rotatably positioned in hemispherical indentations 253 in the inner surface 255 of the housing 256 adjacent the screw thread 249. The balls 251 extend into the screw thread 249. The rod 241 is slidably and rotatably mounted in the housing 256 at the other end 243 by way of a bearing 259 positioned in the other end 243. This arrangement allows the rod 241 to rotate about its longitudinal axis relative to the housing 256, and to slide in an axial direction A relative to the housing. A piston chamber 261 is defined inside the housing 256. The rod 241 sealing extends into the piston chamber 261 to define a piston rod 264, and a piston 262 is secured to the end of the piston rod inside the piston chamber. The piston 262 makes a sealing sliding fit with the housing 256 and divides the chamber 261 into a first fluid chamber 258 and a second fluid chamber 260. The first fluid chamber 258 is fluidly connected to fluid line 266, and the second fluid chamber 260 is fluidly connected to fluid line 268.

The fluid lines 266,268 are connected to a hydraulic circuit as shown in FIG. 5, which is controlled by a control circuit as shown in FIG. 5, or any one of the arrangements shown in FIGS. 6 to 11. The roll control system 222 is operated in substantially the same manner as that described above with reference to FIGS. 1 to 5, or any one of FIGS. 6 to 11

Figure 15:
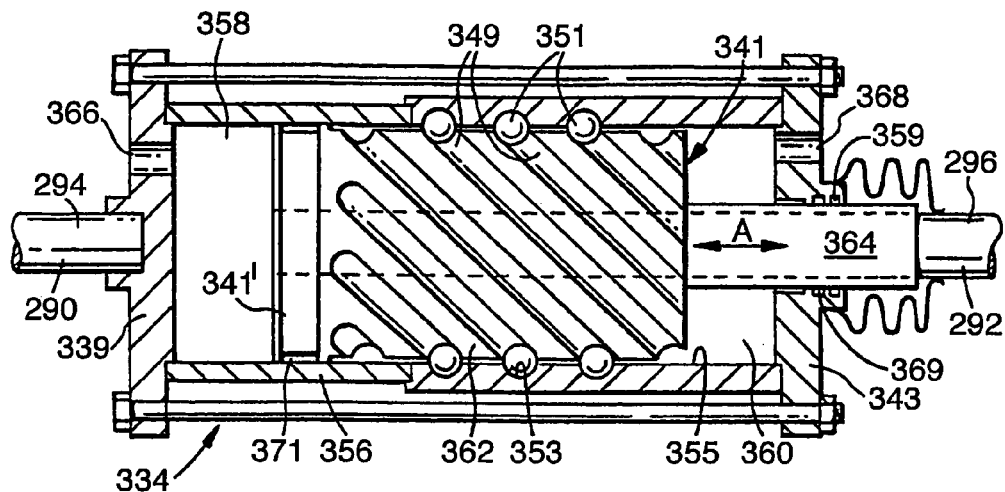
FIG. 15 is a cross-sectional view of an alternative embodiment of hydraulic actuator for the vehicle roll control system of FIG. 13.

An alternative arrangement for the hydraulic actuator of FIG. 14 is shown in FIG. 15. In this alternative embodiment, the actuator 334 comprises a cylindrical housing 356 which is connected at one end 339 to the portion 294 of the first part 290 of the torsion bar 226. The actuator 334 further comprises a rod 341 positioned inside the housing 356, extending out of the other end 343 of the housing, and connectable to the portion 296 of the second part 292 of the torsion bar 226. The rod 341 has an external screw thread 349 adjacent the housing 356. Balls 351 are rotatably positioned in hemispherical indentations 353 in the inner surface 355 of the housing 356 adjacent the screw thread 349. The balls 351 extend into the screw thread 349. The rod 341 is sidably and rotatably mounted in the housing 356 at the other end 343 of the housing by way of a bearing 359 positioned in the other end. The rod 341 makes a sliding guiding fit with the inner surface 355 of the housing 356 at its end 341' remote from the second part 292 of the torsion bar 226. This arrangement allows the rod 341 to rotate about its longitudinal axis relative to the housing 356, and to slide in an axial direction A relative to the housing. First and second fluid chambers 358,360 are defined inside the housing 356. The rod 341 makes a sealing fit with the inner surface 355 of the housing 356 by way of seal 371 to define a piston 362. The first fluid chamber 358 is positioned on one side of the piston 362, and the second fluid chamber 360 is positioned on the other side of the piston. A seal 369 is positioned adjacent the bearing 359. A portion 364 of the rod 341 defines a piston rod which extends through the second fluid chamber 360. The first fluid chamber 358 is fluidly connected to fluid line 366, and the second fluid chamber 360 is fluidly connected to fluid line 368. The fluid lines 366,368 are fluidly connected with one of the hydraulic circuits shown in FIGS. 5 to 11 to actuate the actuator 334.

Figure 16:
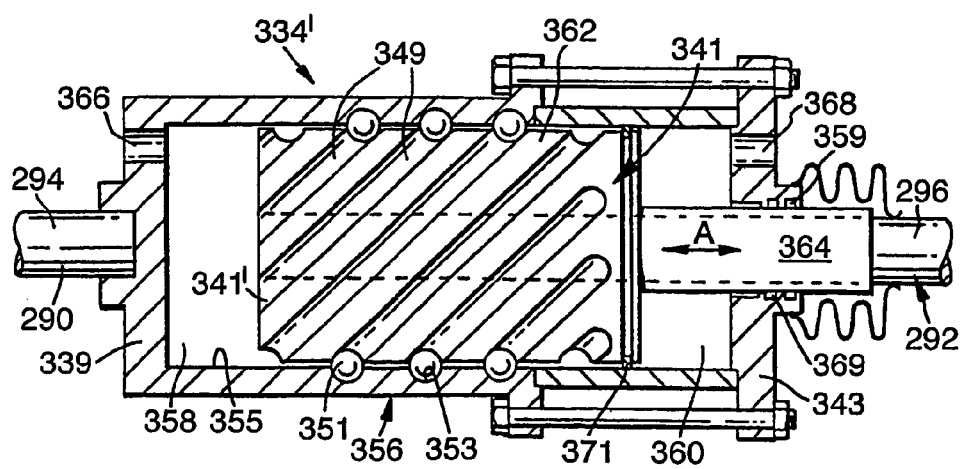
FIG. 16 is a cross-sectional view of a further alternative embodiment of hydraulic actuator for the vehicle roll control system of FIG. 13.

A further alternative arrangement of hydraulic actuator 334' is shown in FIG. 16. In this further alternative embodiment, the actuator 334' is substantially the same as the actuator 334 shown in FIG. 15, but without the sliding guiding fit of the free end 341' of the rod 341 with the housing 356.

In a preferred arrangement, the cross-sectional area of the first fluid chamber of each hydraulic actuator described above is substantially double the cross-sectional area of the piston rod of the hydraulic actuator, when considered on a radial basis. Such an arrangement provides the same output force from the hydraulic actuator in either direction, using the same fluid pressure.

In the preferred arrangement described above, a hydraulic actuator is provided for both the front of the vehicle and the rear of the vehicle, and these hydraulic actuators are substantially the same. In an alternative arrangement, the hydraulic actuator for the front of the vehicle may be a different type to the hydraulic actuator for the rear of the vehicle.

In any of the roll control systems described above, the hydraulic actuator may include a check valve (not shown, but preferably mounted in the piston) which allows flow of hydraulic fluid from the first fluid chamber to the second fluid chamber only when the fluid pressure in the first fluid chamber is greater than the fluid pressure in the second fluid chamber. With such an arrangement, the second fluid chamber can be connected to a reservoir during servicing of the actuator to bleed air from the hydraulic fluid. Also, the presence of the check valve reduces the risk of air being sucked into the second fluid chamber should the fluid pressure in the second fluid chamber fall below the fluid pressure in the first fluid chamber, and provides further improvements in ride comfort.

The invention claimed is:
1. A vehicle roll control system for a vehicle having a pair of front wheels and a pair of rear wheels each rotatable on an axle, comprising:
 a front torsion bar;
 a front first arm attached to the front torsion bar at one end of the front first arm and being connectable to one of the axles of the front wheels at the other end of the front first arm;
 a front hydraulic actuator attached to the front torsion bar;
 a rear torsion bar;

a rear first arm attached to the rear torsion bar at one end of the rear first arm and being connectable to one of the axles of the rear wheels at the other end of the rear first arm;

a rear hydraulic actuator attached to the rear torsion bar; and control means connected to the front and rear hydraulic actuators and controlling the operation thereof on detection of a predetermined vehicle condition;

wherein each front and rear hydraulic actuator comprises a housing, a piston making a sealing sliding fit inside the housing to define a first fluid chamber and a second fluid chamber, and a piston rod connected to the piston and extending through the second fluid chamber and out of the housing; wherein the control means acts on detection of the predetermined vehicle condition to apply a fluid pressure to the first fluid chamber of the front hydraulic actuator which is different from a fluid pressure applied to the first fluid chamber of the rear hydraulic actuator and/or apply a fluid pressure to the second fluid chamber of the front hydraulic actuator which is different from a fluid pressure applied to the second fluid chamber of the rear hydraulic actuator;

wherein the control means comprises a source of fluid pressure, a fluid reservoir, a pressure control valve fluidly connected between the pressure source and the reservoir, a directional valve fluidly connected between the pressure control valve and the hydraulic actuators, and a pressure relief valve fluidly connecting the directional valve to the pressure source or the reservoir;

wherein the pressure relief valve is actuated to create the pressure differential between the first fluid chambers and/or to create the pressure differential between the second fluid chambers.

2. A vehicle roll control system as claimed in claim 1, wherein the second fluid chambers of the front and rear hydraulic actuators are fluidly connectable to the fluid pressure source, and the first fluid chambers are separately fluidly connectable to the fluid pressure source or the fluid reservoir.

3. A vehicle roll control system as claimed in claim 2, wherein the control means comprises the pressure relief valve for fluidly connecting the first fluid chamber of the front actuator to the pressure source or the reservoir; and a second pressure relief valve for fluidly connecting the first fluid chamber of the rear actuator to the pressure source or the reservoir.

4. A vehicle roll control system as claimed in claim 1, wherein the second fluid chamber of the front hydraulic actuator is fluidly connectable to the fluid pressure source; and the first fluid chamber of the front hydraulic actuator and the first and second fluid chambers of the rear hydraulic actuator are separately fluidly connectable to the fluid pressure source or the fluid reservoir.

5. A vehicle roll control system as claimed in claim 4, wherein the control means comprises:
a second directional valve for fluidly connecting the first fluid chambers of the front and rear actuators to the pressure source or the reservoir;
the pressure relief valve for fluidly connecting the second fluid chamber of the rear actuator to the fluid source or the reservoir;
wherein the second directional valve is positioned in fluid series between the first directional valve and the pressure relief valve.

6. A vehicle roll control system as claimed in claim 1, wherein the directional valve includes a first directional valve, in a de-actuated state, fluidly connecting the first fluid chambers to one another, and fluid connects the second fluid chambers to one another in isolation of the first fluid chambers.

7. A vehicle roll control system as claimed in claim 1, wherein the directional valve includes a first directional valve, in a de-actuated state, fluidly isolating the first fluid chambers from one another, and fluid isolates the second fluid chambers from one another and from the first fluid chambers.

8. A vehicle roll control system as claimed in claim 1, wherein the directional valve includes a first directional valve, in a de-actuated state, fluidly connecting the pressure source to the reservoir.

9. A vehicle roll control system as claimed claim 1, wherein the directional valve includes a first directional valve, in a de-actuated state, fluidly isolating the pressure source from the reservoir.

10. A vehicle roll control system as claimed in claim 1, wherein the directional valve includes a first directional valve actuated by a solenoid.

11. A vehicle roll control system as claimed in claim 1, wherein the directional valve includes a first directional valve hydraulically actuated by a pilot valve.

12. A vehicle roll control system as claimed in claim 1, wherein the directional valve includes a first directional valve and a second directional valve and the control means further comprises an electronic control module which receives signals dependent on the predetermined vehicle condition, and which controls the position of the first and second directional valves.

13. A vehicle roll control system as claimed in claim 1, wherein the cross-sectional area of the first fluid chamber of each actuator is substantially double the cross-sectional area of the piston rod of each actuator.

14. A vehicle roll control system as claimed in claim 1, wherein the front hydraulic actuator is attached to the front torsion bar at one end of the front hydraulic actuator and is connectable to the other axle of the front wheels at the other end of the front hydraulic actuator; and wherein the rear hydraulic actuator is attached to the rear torsion bar at one end of the rear hydraulic actuator and is connectable to the other axle of the rear wheels at the other end of the rear hydraulic actuator.

15. A vehicle roll control system as claimed in claim 14; further comprising:
a second front arm rotatably mounted on the front torsion bar at one end of the second front arm and being connectable to the other axle of the front wheels at the other end of the second front arm; wherein the front hydraulic actuator controls the rotation of the second front arm relative to the front torsion bar; and
further comprising a second rear arm rotatably mounted on the rear torsion bar at one end of the second rear arm and being connectable to the other axle of the rear wheels at the other end of the second rear arm; wherein the rear hydraulic actuator controls the rotation of the second rear arm relative to the rear torsion bar.

16. A vehicle roll control system as claimed in claim 1, wherein each hydraulic actuator is attached directly to its associated torsion bar at one end of the hydraulic actuator.

17. A vehicle roll control system as claimed in claim 1, wherein each hydraulic actuator is attached to its associated torsion bar between axially aligned portions of first and second parts of the torsion bar.

18. A vehicle roll control system as claimed in claim 1, wherein each hydraulic actuator includes a check valve which allows fluid to flow from the first fluid chamber to the second fluid chamber when the fluid pressure in the first fluid chamber exceeds the fluid pressure in the second fluid chamber.

19. A vehicle roll control system as claimed in claim 18, wherein the check valve is mounted in the piston.

* * * * *

UNITED STATES PATENT AND TRADEMARK OFFICE
CERTIFICATE OF CORRECTION

PATENT NO. : 8,065,056 B2
APPLICATION NO. : 11/579466
DATED : November 22, 2011
INVENTOR(S) : Philippe Germain et al.

It is certified that error appears in the above-identified patent and that said Letters Patent is hereby corrected as shown below:

Column 12, Line 10: "claimed claim 1" should read -- claimed in claim 1 --.

Column 23, Line 38: "claim 14;" should read -- claim 14, --.

Signed and Sealed this
Tenth Day of January, 2012

David J. Kappos
*Director of the United States Patent and Trademark Office*